United States Patent
Hodgkins et al.

(10) Patent No.: US 12,522,509 B2
(45) Date of Patent: *Jan. 13, 2026

(54) METHOD TO CO-SYNTHESIZE AMORPHOUS AND CRYSTALLINE MATERIALS IN THE PRESENCE OF ODSO

(71) Applicant: Saudi Arabian Oil Company, Dhahran (SA)

(72) Inventors: Robert Peter Hodgkins, Dhahran (SA); Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 410 days.

This patent is subject to a terminal disclaimer.

(21) Appl. No.: 18/057,910

(22) Filed: Nov. 22, 2022

(65) Prior Publication Data

US 2024/0199434 A1    Jun. 20, 2024

(51) Int. Cl.
| | |
|---|---|
| *C01B 39/04* | (2006.01) |
| *C01B 39/24* | (2006.01) |
| *C01B 39/26* | (2006.01) |
| *C01B 39/46* | (2006.01) |

(52) U.S. Cl.
CPC .............. *C01B 39/04* (2013.01); *C01B 39/24* (2013.01); *C01B 39/265* (2013.01); *C01B 39/46* (2013.01)

(58) Field of Classification Search
None
See application file for complete search history.

(56) References Cited

U.S. PATENT DOCUMENTS

| | | |
|---|---|---|
| 3,313,594 A | 4/1967 | Wilson |
| 3,516,786 A | 6/1970 | Maher et al. |
| 3,556,725 A | 1/1971 | Chiola et al. |
| 3,702,886 A | 11/1972 | Argauer et al. |
| 3,886,094 A | 5/1975 | Pilato et al. |
| 4,402,867 A | 9/1983 | Rodewald |
| 4,406,823 A | 9/1983 | Laurent et al. |
| 5,763,720 A | 6/1998 | Buchanan et al. |
| 5,951,962 A | 9/1999 | Müller et al. |
| 6,337,063 B1 | 1/2002 | Rouleau et al. |
| 6,402,936 B1 | 6/2002 | Benazzi et al. |
| 7,041,753 B2 | 5/2006 | McDaniel et al. |
| 7,923,522 B2 | 4/2011 | Hamada et al. |
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,927,318 B2 | 2/2021 | Koseoglu et al. |
| 11,111,212 B2 | 9/2021 | Koseoglu et al. |
| 11,124,713 B2 | 9/2021 | Koseoglu et al. |
| 2020/0332201 A1* | 10/2020 | Koseoglu ............. C07C 2/06 |

FOREIGN PATENT DOCUMENTS

| | | |
|---|---|---|
| CN | 102452663 A | 5/2012 |
| CN | 103055933 A | 4/2013 |
| CN | 106145134 A | 11/2016 |
| CN | 107982540 A | 5/2018 |
| EP | 0999183 B1 | 6/2003 |
| EP | 2392548 A1 | 12/2011 |
| GB | 1191467 | 11/1967 |
| GB | 2017520 A | 10/1979 |
| WO | 2018202468 A1 | 11/2018 |

OTHER PUBLICATIONS

Daeyaert et al. "Machine-learning approach to the design of OSDAs for zeolite beta." Proceedings of the National Academy of Sciences 116.9 (2019): 3413-3418.

Gizetdinova et al. "Effect of the Alumosilicate Gels pH on Zeolite Phase Composition for the Co-crystallization of BEA/MOR Zeolites in Na2O-? Br—Al2O3—SiO2—H2O System." Journal of Chemistry and Chemical Engineering 8.5 (2014) 453-460.

Grabicka et al. "Microwave-assisted synthesis of periodic mesoporous organosilicas with ethane and disulfide groups." Microporous and mesoporous materials 119.1-3 (2009): 144-149.

Jin et al. "Gold nanoparticles stabilized in a novel periodic mesoporous organosilica of SBA-15 for styrene epoxidation." Microporous and mesoporous materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

Qi et al. "Studies on the crystallization process of BEA/MOR co-crystalline zeolite." Journal of materials science 43.16 (2008): 5626-5633.

Feng, et al., "Direct Synthesis of ZSM-5 and Mordenite Using Poly(ethylene glycol) as a Structure-Directing Agent", Journal of Porous Materials, Oct. 2003, pp. 235-242.

* cited by examiner

*Primary Examiner* — Sheng H Davis
(74) *Attorney, Agent, or Firm* — Leason Ellis LLP

(57) ABSTRACT

The present disclosure is directed to a method to co-synthesize amorphous and crystalline porous materials, including a phase of crystalline solids possessing well-defined structures and uniform pore sizes, and an amorphous phase. A sol-gel formulation which includes a water-soluble fraction of ODSO as an additional component is provided that precipitates multiple solid phases.

20 Claims, 5 Drawing Sheets

METHOD TO CO-SYNTHESIZE AMORPHOUS AND CRYSTALLINE MATERIALS IN THE PRESENCE OF ODSO

FIELD OF THE DISCLOSURE

The present disclosure relates to methods of co-synthesizing materials including amorphous and crystalline materials.

BACKGROUND OF THE DISCLOSURE

Zeolites and related crystalline solids (also known as "zeotypes") are microporous crystalline solids possessing well-defined structures and uniform pore sizes that can be measured in angstroms (Å). Typically, zeolites comprise framework atoms such as silicon, aluminum and oxygen arranged as silica and alumina tetrahedra. Other related crystalline solids include crystalline aluminophosphates, silicon-substituted aluminophosphates or metal aluminophosphates. Zeolites are generally hydrated aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others.

Aluminosilicate zeolites are typically synthesized via hydrothermal means from which zeolite crystals precipitate from a gel, using water as a solvent. The aluminosilicate zeolite comprises repeating tetrahedral unit cells as its framework comprising silicon, aluminum and oxygen. When trivalent Al substitutes for tetrahedral silica in the framework a negative charge is induced that is counterbalanced by a cation, typically an alkali metal such as $Na^+$. In order for the zeolite to exhibit acidity the sodium cation should be replaced with a proton. The proton associated with counter-balancing the negative charge derived from the framework aluminum results in a Brønsted acid site. Lewis acidity typically results from extra-framework aluminum.

Solid catalyst manufacturing processes, which can vary considerably from one catalyst to another, include bulk catalysts and supports, and impregnated catalysts starting from preformed supports. Typical catalyst preparation or manufacturing steps are: precipitation, hydrothermal transformation, decantation, filtration, centrifugation, washing, drying, crushing and grinding, sieving, kneading/mulling, and forming operations. The formed particles can be subjected to thermal treatment, calcination. In certain embodiments, catalytically active materials are impregnated on the surface of, and/or within the pores of, the bulk catalyst particles and/or catalyst support particles. Precipitation involves the mixing of solutions or suspension of materials, resulting in the formation of a precipitate, which may be crystalline or amorphous. Kneading/mulling of wet solid materials usually leads to the formation of dough that is subsequently formed and dried. Often kneaded/mulled product is subjected to thermal treatment to obtain more intimate contact between components and better homogeneity by thermal diffusion and solid-state reactions. In certain catalyst particles, catalytically active materials (such as one or more active metal components, which varies widely depending on the application) are subsequently added by impregnation or incipient wetting methods.

In synthesis of zeolite-based catalysts, during forming steps raw materials include one or more zeolite components and one or more amorphous inorganic oxides as binders. Such binder materials are used to increase the post-compression adhesion, and facilitate making the catalyst particles in a desired form. In typical syntheses, amorphous inorganic oxides are separately provided and prepared for mixing with the zeolite components.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process, in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in U.S. Pat. No. 10,807,947, the by-product DSO compounds from the mercaptan oxidation process can be oxidized, preferably in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known ways to produce zeolites, there remains a need in the art for improved methods to produce zeolite materials, in particular using DSO by-products in an economically and environmentally friendly manner. It is in regard to these and other problems in the art that the present disclosure is directed to provide a technical solution for an effective method of increasing the efficiency of catalyst production.

SUMMARY OF THE DISCLOSURE

A method to co-synthesize amorphous material and crystalline material is provided. The method comprises: forming a homogeneous aqueous mixture of precursors and reagents effective for a crystalline material and/or an amorphous material, water and an effective amount of water-soluble oxidized disulfide oil (ODSO); and heating the homogeneous aqueous mixture under conditions and for a time effective to form a precipitate suspended in a supernatant as an intermediate suspension, wherein the precipitate comprises crystalline material and amorphous material. In certain embodiments, the crystalline material comprises about 0.1-99.9, 1-99.9, 10-99.9, 20-99.9, 0.1-95, 1-95, 10-95, 20-95, 0.1-90, 1-90, 10-90 or 20-90 percent by mass of the precipitate and wherein at least a portion of remaining precipitate comprises amorphous material. In certain embodiments, the amorphous material comprises one or more of silica, alumina or silica-alumina.

In certain embodiments, the crystalline material comprises a crystalline aluminosilicate zeolite, and wherein the precursors and reagents comprise a silica source, an aluminum source, an alkali metal source, an optional structure directing agent and an optional seed material. In certain embodiments, the crystalline material comprises pure silica zeolite, and wherein the precursors and reagents comprise a silica source, and one or both of a structure directing agent and a seed material.

In certain embodiments, the precursors and reagents are effective for a crystalline material comprising a crystalline aluminosilicate, and wherein the precursors and reagents comprise a silica source, an aluminum source, an optional structure directing agent and an optional seed material, and wherein an alkali metal source is provided from a pH modified ODSO composition comprising an aqueous mixture of one or more water-soluble ODSO compounds and an effective amount of an alkaline agent, and wherein the alkaline agent includes an alkali metal component as the alkali metal source. In certain embodiments, a silica to alumina molar ratio (SAR) of the crystalline aluminosilicate varies based on the type of crystalline aluminosilicate, wherein: the crystalline aluminosilicate comprises MFI zeolite including ZSM-5 and wherein the SAR is in the range of about 20-1500, 20-1000, 20-500, 25-1500, 25-1000, 25-500, 50-1500, 50-1000, 50-500, 100-1500, 100-1000 or 100-500; the crystalline aluminosilicate comprises *BEA zeolites, MOR zeolites or co-crystallized *BEA/MOR zeolites wherein the SAR greater than 10, in certain embodiments in the range of about 10-10000, 10-5000, 10-500, 10-100, 10-80, 50-10000, 50-5000, 50-1000, 50-500 or 50-100; or the crystalline aluminosilicate comprises zeolite Y and wherein the SAR is in the range of about 3-6. In certain embodiments, the precipitate is calcined at a suitable temperature, temperature ramp rate and for a suitable period of time to realize porous co-synthesized amorphous material and crystalline aluminosilicate.

In certain embodiments, the alkali metal source is a mineralizer selected from the group consisting of NaOH, KOH, RbOH, LiOH, CsOH and combinations comprising two or more of the foregoing mineralizers. In certain embodiments, the alkali metal source is sodium, and wherein: the crystalline aluminosilicate comprises zeolite Y and a mass ratio of ODSO to sodium from the alkali metal source is in the range of about 1.9-2.4; the crystalline aluminosilicate comprises MFI zeolite and a mass ratio of ODSO to sodium from the alkali metal source is in the range of about 7.9-8.9; and wherein increased mass ratio of ODSO to sodium within the ranges increases a relative amount of amorphous material in the precipitate. In certain embodiments: a cumulative amount of ODSO and water is approximately equivalent to an amount of water that is effective to produce crystalline aluminosilicate in the absence of ODSO; the cumulative amount of ODSO and water, an amount of the silica source, an amount of the aluminum source, an amount of the alkali metal source, and an amount of the optional structure directing agent are provided at an ODSO-enhanced compositional ratio; the ODSO-enhanced compositional ratio is approximately equivalent to a baseline compositional ratio of water, silica source, aluminum source, alkali metal source and optional structure directing agent, the baseline compositional ratio being effective to produce crystalline aluminosilicate in the absence of ODSO; and the conditions and time of heating are approximately equivalent to those that are effective to produce crystalline aluminosilicate in the absence of ODSO.

In certain embodiments: the homogeneous aqueous mixture is (optionally) aged before being subjected to heating for a period of about 0-48, 0-24, 0-5, 0.5-24 or 0.5-5 hours; the homogeneous aqueous mixture is heated at a temperature in the range of about 90-200, 90-190, 90-180, 120-200, 120-190, 120-180, 145-200, 145-190 or 145-180° C.; the homogeneous aqueous mixture is heated at autogenous pressure or a pressure in the range of atmospheric to 17 bar; and the homogeneous aqueous mixture is heated for a crystallization time period within the range of about 0.1-8, 0.2-8, 0.5-8, 1-8, 0.1-6, 0.2-6, 0.5-6, 1-6, 0.1-4, 0.2-4, 0.5-4 or 1-4 days.

In certain embodiments the ODSO is derived from oxidation of disulfide oil compounds present in an effluent refinery hydrocarbon stream recovered following catalytic oxidation of mercaptans present in a mercaptan-containing hydrocarbon stream. In certain embodiments the ODSO compounds have 3 or more oxygen atoms and include: one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR); two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR); one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH); or two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH); wherein R and R' are C1-C10 alkyl or C6-C10 aryl groups.

In certain embodiments, a method of producing support particles for a catalyst is provided. Amorphous material and crystalline material co-synthesized described herein is provided. The co-synthesized amorphous material and crystalline material is mixed and kneaded the with an effective amount of water to form a composite paste. The composite paste is formed into support particles, for instance by extrusion.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
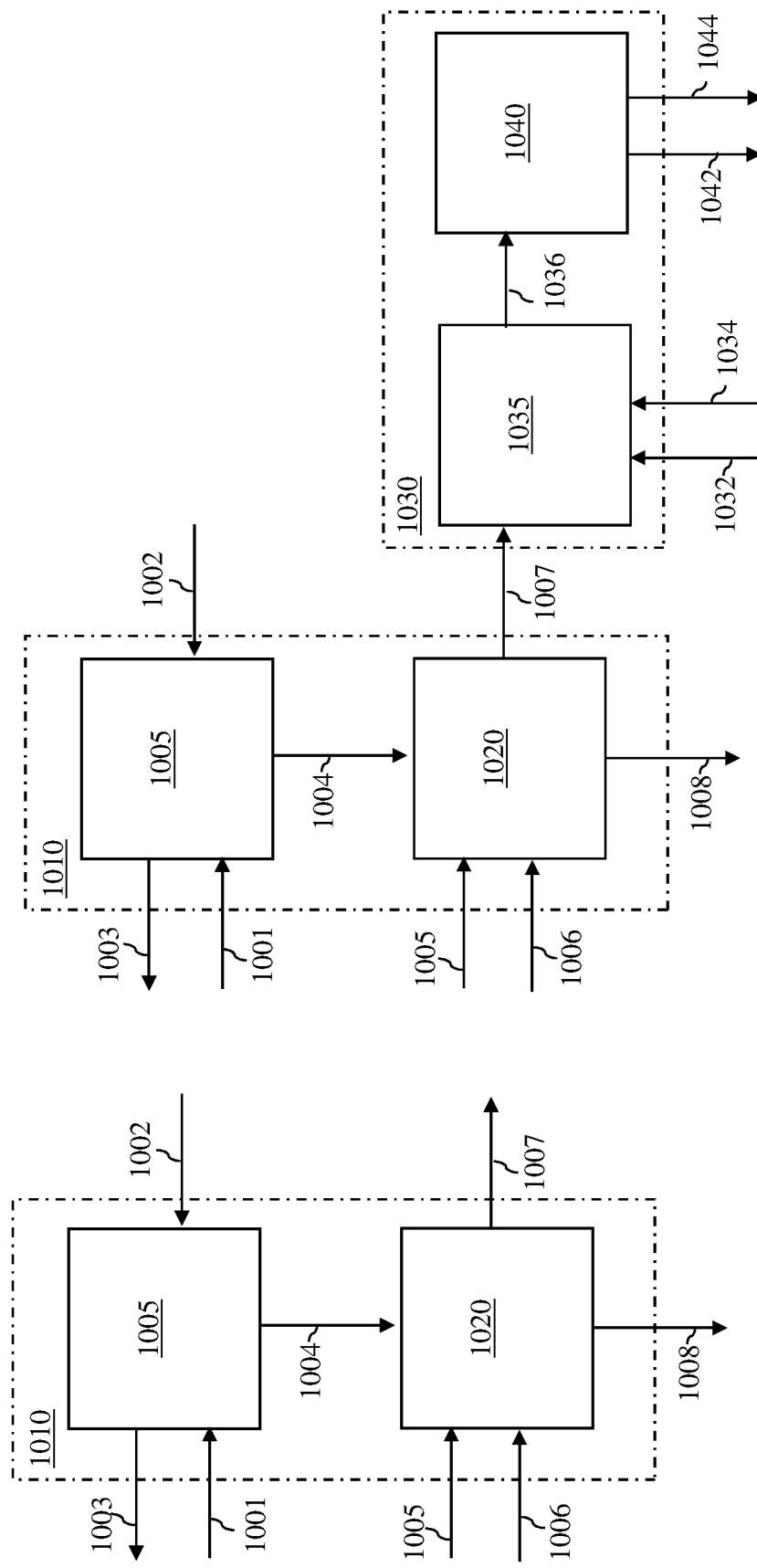
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

The present disclosure is directed to a method to co-synthesize amorphous and crystalline porous materials, including a phase of crystalline solids possessing well-defined structures and uniform pore sizes, and an amorphous phase. A sol-gel formulation which includes a water-soluble fraction of ODSO as an additional component is provided that precipitates multiple solid phases.

In some embodiments a sol-gel composition is formed that includes precursors and reagents effective for a crystalline material and/or an amorphous material, water and water-soluble oxidized disulfide oil (ODSO). The sol-gel composition mixture is heated under conditions and for a time effective to form precipitate suspended in a supernatant, wherein the precipitate comprises multiple solid phases: a phase of crystalline solids possessing well-defined structures and uniform pore sizes, and an amorphous phase. In some embodiments, an increase in a sub-ratio of water-soluble ODSO to water effects an increase of a relative amount of amorphous material in the precipitate.

In some embodiments, the resulting products include mixed precipitate phases of amorphous material and crystalline material. In certain embodiments, the ratio of amorphous to crystalline materials can be tailored by adjusting the amount of ODSO component in the sol-gel formulation. For example, the crystalline phase can comprise about 0.1-99.9, 1-99.9, 10-99.9, 20-99.9, 0.1-95, 1-95, 10-95, 20-95, 0.1-90, 1-90, 10-90 or 20-90 percent by mass of the precipitate, and wherein all or at least a portion of remaining precipitate comprises amorphous material. The amorphous material may comprise one or more of silica, alumina or silica-alumina.

The co-synthesized crystalline phase comprises one or more types of zeolites, pure silica zeolites (PSZs), crystalline aluminophosphates (AlPOs), silicon-substituted aluminophosphates (SAPOs) or metal aluminophosphates (MeAPOs). In some embodiments, the crystalline material phase is one or more types of zeolite, and precursors and reagents effective for the crystalline material comprise a silica source, an aluminum source, an optional alkali metal source, an optional structure directing agent and an optional seed material. In some embodiments, the crystalline material phase is one or more types of pure silica zeolites, and precursors and reagents effective for the crystalline material comprise a silica source, an optional alkali metal source, and either a structure directing agent, a seed material or both a structure directing agent and a seed material. In some embodiments, the crystalline material phase is crystalline aluminophosphates (AlPOs), and precursors and reagents effective for the crystalline material comprise an aluminum source, a phosphorus source, an acid medium, an optional structure directing agent and an optional seed material. In some embodiments, the crystalline material phase is silicon-substituted aluminophosphates, silicoaluminophosphate (SAPOs), and precursors and reagents effective for the crystalline material comprise an aluminum source, a silica source, a phosphorus source, an acid medium, an optional structure directing agent and an optional seed material. In some embodiments, the crystalline material phase is metal aluminophosphates (MeAPOs), and precursors and reagents effective for the crystalline material comprise an aluminum source, a metal source, a phosphorus source, an acid medium, an optional structure directing agent and an optional seed material.

In conventional synthesis of materials, water is used as an aqueous medium and as a solvent. In the embodiments of the present disclosure, an effective amount of water-soluble ODSO compounds is added within a homogeneous aqueous mixture. In certain embodiments an effective amount of water-soluble ODSO is approximately equivalent to an amount water replaced by the ODSO, on a mass or volume basis. Methods for the preparation of materials of various types are known and discussed herein for reference, but it is understood that variations of that which is disclosed herein can benefit from the use of a water-soluble ODSO component. In certain embodiments, the ODSO is derived from a sulfur-containing refinery waste stream of disulfide oil and is used as a component for the co-synthesis of mixed precipitate phases of amorphous material and crystalline material.

In the embodiments herein, the type of material, and sub-type of material within a given material type, can be controlled by one or more factors including but not limited to the precursor and reagent selections and ratios (for example, silica to alumina ratio), pH of the sol-gel, aging time (if any), crystallization temperature and crystallization time. In certain embodiments herein, the addition of the water soluble ODSO component in the synthesis process results in a different sub-type or even type of material as compared to an approximately equivalent process in the absence of the added water soluble ODSO component. In certain embodiments herein, the compositional ratios of the precursors and reagents can be approximately equivalent to those used in synthesis of similar products in the absence of the water soluble ODSO component herein. In some embodiments, for instance as demonstrated in Examples 3A-3D herein, the addition of the water soluble ODSO component herein shifts the phase boundary outside of the typical product for the selection and ratio of precursors and reagents. For example, where the only difference in compositional selection and ratio pertains to substitution of added water with the active component carrier composition herein, the material type shifts from ANA to ZSM-5.

The water-soluble ODSO component can be in the form of a neat water-soluble ODSO, as an aqueous water-soluble ODSO solution, a mixture with an alkaline source as a pH modified water-soluble ODSO composition, and/or a supernatant from a prior synthesis using water-soluble ODSO. In embodiments herein, co-synthesis of amorphous materials and crystalline materials includes an aqueous water-soluble ODSO composition that contributes a portion of requisite utility water for the sol-gel, wherein the water-soluble ODSO composition is used in place of a certain amount of water. In embodiments herein, co-synthesis of amorphous materials and crystalline materials includes a water-soluble ODSO composition that contributes all or a portion of requisite mineralizer for the sol-gel, for example, using a pH-modified water-soluble ODSO composition comprising an aqueous mixture of one or more water-soluble ODSO compounds and an effective amount of an alkaline agent as disclosed in co-pending and commonly owned U.S. patent application Ser. No. 17/850,158 filed on Jun. 27, 2022, entitled "pH-Modified Water-Soluble Oxidized Disulfide Oil Compositions" and Ser. No. 17/850,115 filed on Jun. 27, 2022, entitled "Method of Zeolite Synthesis Including pH-Modified Water-Soluble Oxidized Disulfide Oil Compositions" which are incorporated by reference herein in their entireties. In certain embodiments the water-soluble ODSO component is provided as a pH-modified water-soluble ODSO composition, and is used in place of all or a portion of requisite mineralizer for zeolite synthesis, and in place of a certain amount of water (including all or a portion of utility water). In embodiments herein, co-synthesis of amorphous materials and crystalline materials includes supernatant from a prior synthesis that utilized water-soluble ODSO as a component in place of a certain amount of utility water, for example as disclosed in co-pending and commonly owned U.S. patent application Ser. No. 17/850,285 filed on Jun. 27, 2022, entitled "Method of Synthesizing Materials Integrating Supernatant Recycle" which is incorporated by reference herein in its entirety.

An effective amount of water for the aqueous environment and as a solvent during the sol-gel process can be provided from one or more water sources, including utility water that is added to form the homogeneous aqueous mixture, or a water-containing source of precursors and/or reagents such as a water-containing silica source such as colloidal silica, an aqueous mixture of an aluminum source, an aqueous mixture of an alkali metal source, and/or an aqueous mixture of an optional structure directing agent. These mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In the descriptions that follow, it is understood that water is a component of homogeneous aqueous mixtures from one or more of the sources of water.

In embodiments herein, a portion of the of water required for sol-gel synthesis is replaced with an effective amount of water soluble ODSO. The water that is replaced with water soluble ODSO can be all or a portion of the utility water that would typically be added. In certain embodiments the effective amount of water soluble ODSO is approximately equivalent amount to the amount of water being replaced, on a mass or volume basis.

In some embodiments, the crystalline component is a crystalline aluminosilicate zeolite and precursors and reagents effective for the crystalline material comprise a silica source, an optional aluminum source, a mineralizer, such as an alkali metal source, an optional structure directing agent and an optional a seed material. Without wishing to be bound by theory, the mechanism of zeolite crystallization generally involves nucleation of individual particles precedes zeolite crystal growth. The nucleation phase results in discrete entities of the new phase to which nutrients attach allowing for zeolite growth that follows a classic S-shape crystallization curve.

The present disclosure is applicable to various types of zeolites that are synthesized hydrothermally, which can benefit from inclusion of ODSO components as described herein in the synthesis. Suitable zeolitic materials include those identified by the International Zeolite Association (IZA), including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *-SSO, *STO, *—SVY, *UOE. In certain embodiments, zeolites synthesized herein comprise co-crystallized products of two or more types of zeolites identified above.

For example, certain non-limiting examples of zeolites known to be useful in the petroleum refining industry include but are not limited to those possessing MFI, FAU, *BEA, MOR, or CHA frameworks. In certain embodiments a zeolite component in the co-synthesized crystalline and amorphous product can be MFI framework, which includes ZSM-5, having a micropore size related to the 10-member rings when viewed along the and directions of 5.5×5.1 Å and 5.6×5.3 Å, respectively. In certain embodiments a zeolite component in the co-synthesized crystalline and amorphous product can be FAU framework, which includes USY, having a micropore size related to the 12-member ring when viewed along the direction of 7.4×7.4 Å. In certain embodiments a zeolite component in the co-synthesized crystalline and amorphous product can be *BEA framework, which includes zeolite beta polymorph A, having a micropore size related to the 12-member rings when viewed along the and directions of 6.6×6.7 Å and 5.6×5.6 Å, respectively. In certain embodiments a zeolite component in the co-synthesized crystalline and amorphous product can be MOR framework, which includes mordenite zeolites, having a micropore size related to the 12-member ring and 8-member ring when viewed along the and directions of 6.5×7.0 Å and 2.6×5.7 Å, respectively. In certain embodiments a zeolite component in the co-synthesized crystalline and amorphous product can be CHA framework zeolite, which includes chabazite zeolite, having a micropore size related to the 8-member ring when viewed normal to the direction of 3.8×3.8 Å.

In an embodiment of a method of co-synthesizing zeolite (s) and amorphous materials, effective amounts and proportions of precursors and reagents are formed together with water-soluble ODSO as a homogeneous aqueous mixture, including a water source, an optional aluminum source, a silica source, an alkali metal source (to provide OH" as a mineralizer), an optional structure directing agent and an optional seed material. An effective amount of a water-soluble ODSO component is used as an additional component in the co-syntheses processes herein. The water-soluble ODSO component can be in the form of a neat water-soluble ODSO, as an aqueous water-soluble ODSO solution, a mixture with an alkaline source as a pH modified water-soluble ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The chronological sequence of mixing can vary, with the objective being a highly homogenous distribution of the components in an aqueous mixture. In certain embodiments, the homogeneous aqueous mixture is formed by: providing a silica source; combining an optional aluminum source, an optional mineralizer and an optional structure directing agent; and combining water soluble ODSO. In certain embodiments, the homogeneous aqueous mixture is formed by: providing an optional aluminum source, an optional mineralizer and an optional structure directing agent as a mixture; combining a silica source; and combining a water soluble ODSO. In certain embodiments, the homogeneous aqueous mixture is formed by: combining a water soluble ODSO with a silica source to form a mixture; and that mixture is combined with an optional aluminum source, an optional mineralizer and an optional structure directing agent. In certain embodiments, the homogeneous aqueous mixture is formed by: combining a water soluble ODSO with an optional aluminum source, an optional mineralizer and an optional structure directing agent to form a mixture; and that mixture is combined with a silica source.

A homogeneous aqueous mixture of the precursors and reagents, including water soluble ODSO, is formed from any of the above chronological sequences of component addition, or other suitable sequence. According to embodiments of the methods herein, the relative amount of water-soluble ODSO in the initial homogeneous aqueous mixture is effective to co-synthesize one or more crystalline zeolite phases and one or more phases of amorphous silica, amorphous silica and/or amorphous silica-alumina. The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying. In certain embodiments the recovered precipitate is calcined at a suitable temperature, temperature ramp rate and for a suitable period of time.

The eventual framework of the as-made crystalline zeolite component depends on various factors including but not limited to the time and/or temperature of hydrothermal reaction; selected structure directing agents (if any); selected seeds (if any); and/or selected mineralizer. In certain embodiments, inclusion of a water-soluble ODSO shifts a phase boundary of a sol-gel composition to a certain type of crystalline material (including a sub-type) framework type having an approximately equivalent amount of water being replaced, even using compositional ratios and conditions (other than the water-soluble ODSO) typically effective for synthesis of a different type of crystalline material, a different sub-type of zeolite, or that would typically produce amorphous material.

In some embodiments, the crystalline component is crystalline pure silica zeolite (PSZ) and precursors and reagents effective for the crystalline material comprise a silica source, and one or both of a structure directing agent and a seed material. For example, in certain known synthesis a structure directing agent is used and a seed material is optional, and if further embodiments a seed material is used and a structure directing agent is optional. In certain instances, these purely siliceous crystalline materials are referred to as zeolites with a SAR close to infinity, such as silicalites (e.g., Silicalite-1). The present disclosure is applicable to various PSZs that are synthesized hydrothermally, which can benefit from inclusion of ODSO components as described herein in the synthesis. Suitable PSZ materials include but are not limited to PSZ sub-types: SSZ-24 (AFI), octadecasil (AST), SSZ-55d (ATS), zeolite beta (BEA), ITQ-14 (BEC), CIT-5 (CFI), chabazite (CHA), deca-dodecasil (DDR), dodecasil-1H (DOH), UTD-1 (DON), EU-1 (EUO), ferrierite (FER), GUS-1 (GON), SSZ-42 (IFR), ITQ-4 (IFR), ITQ-32 (IHW), ITQ-7 (ISV), ITQ-3 (ITE), ITQ-13 (ITH), ITQ-12 (ITW), ITQ-24 (IWR), ITQ-29 (LTA), ZSM-11 (MEL), silicalite, ZSM-5 (MFI), MCM-35 (MTF), ZSM-39, dodecasil-3c (MTN), ZSM-23 (MTT), ZSM-12 (MTW), ITQ-1, MCM-22, SSZ-25 (MWW), nonasil (NON), RUB-41 (RRO), RUB-3 (RTE), RUB-10 (RUT), RUB-24 (RWR), SSZ-73 (SAS), sigma-2 (SGT), sodalite trioxane (SOD), SSZ-31 (NA), SSZ-35, ITQ-9, MU-26 (STF), SSZ-23 (STT), and theta-1 (TON).

In an embodiment of a method of co-synthesizing one or more PSZs and amorphous materials, effective amounts and proportions of precursors and reagents are formed together with water-soluble ODSO as a homogeneous aqueous mixture, including a water source, a silica source, and one or both of a structure directing agent and a seed material. An effective amount of a water-soluble ODSO component is used as an additional component in the co-syntheses processes herein. The water-soluble ODSO component can be in the form of a neat water-soluble ODSO, as an aqueous water-soluble ODSO solution, a mixture with an alkaline source as a pH modified water-soluble ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to co-synthesize one or more crystalline PSZ phases and one or more phases of amorphous silica, amorphous silica and/or amorphous silica-alumina. The eventual framework of the as-made crystalline component depends on various factors including but not limited to the time and/or temperature of hydrothermal reaction; selected structure directing agents (if any); and/or selected seeds.

In some embodiments, the crystalline component is crystalline aluminophosphates (AlPO) and precursors and reagents effective for the crystalline material comprise an aluminum source, a phosphorus source, an acid medium, an optional structure directing agent and an optional seed material. The present disclosure is applicable to various AlPOs that are synthesized hydrothermally, which can benefit from inclusion of ODSO components as described herein in the synthesis. Suitable AlPO materials include but are not limited to AlPO sub-types: (AEI) including AlPO-18, (AEL) including AlPO-11, (AEN) including AlPO-53, (AET) including AlPO-8, (AFI) including AlPO-5, (AFN) including AlPO-14, (AFO) including AlPO-41, (AFR) including AlPO-40; (AFT) including AlPO-52; (ANA) including AlPO-24; (AST) including AlPO-16; (ATO) including AlPO-31; (ATS) including AlPO-36; (ATT) including AlPO-33; (ATV) including AlPO-25; (AWO) including AlPO-21; (AWW) including AlPO-22; (CHA) including AlPO-34; (ERI) including AlPO-17; (LEV) including AlPO-35; (SOD) including AlPO-20; or (VFI) including AlPO-54.

In an embodiment of a method of co-synthesizing one or more AlPOs and amorphous materials, effective amounts and proportions of precursors and reagents are formed together with water-soluble ODSO as a homogeneous aqueous mixture, including a water source, an aluminum source, a phosphorus source, an acid medium, an optional structure directing agent and an optional seed material. It is understood that the phosphorus source and the acid medium can be the same, for instance, phosphoric acid. An effective amount of a water-soluble ODSO component is used as an additional component in the co-syntheses processes herein. The water-soluble ODSO component can be in the form of a neat water-soluble ODSO, as an aqueous water-soluble ODSO solution, a mixture with an alkaline source as a pH modified water-soluble ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to co-synthesize one or more crystalline AlPO phases and one or more phases of amorphous silica, amorphous silica and/or amorphous silica-alumina. The eventual framework of the as-made crystalline component depends on various factors including but not limited to the time and/or temperature of hydrothermal reaction; selected structure directing agents (if any); and/or selected seeds. In certain embodiments, inclusion of a water-soluble ODSO shifts a phase boundary of a sol-gel composition to a certain AlPO framework type having an approximately equivalent amount of water being replaced, even using compositional ratios and conditions (other than the water-soluble ODSO) typically effective for synthesis of a different type or sub-type of crystalline material, or that would typically produce amorphous material.

In some embodiments, the crystalline component is silicon-substituted aluminophosphates, silicoaluminophosphate (SAPOs) and precursors and reagents effective for the crystalline material comprise an aluminum source, a silica source, a phosphorus source, an acid medium, an optional structure directing agent and an optional seed material. The present disclosure is applicable to various SAPOs that are synthesized hydrothermally, which can benefit from inclusion of ODSO components as described herein in the synthesis. Suitable SAPO materials include but are not limited to SAPO sub-types: (AEI) including SAPO-18, (AEL) including SAPO-11, (AFI) including SAPO-5, (AFO) including SAPO-41, (AFR) including SAPO-40, (AFX) including SAPO-56, (ATN) including SAPO-39, (ATO) including SAPO-31, (CHA) including SAPO-34 and -47, (FAU) including SAPO-37, (GIS) including SAPO-43, (LEV) including SAPO-35, or (LTA) including SAPO-42.

In an embodiment of a method of co-synthesizing one or more SAPOs and amorphous materials, effective amounts and proportions of precursors and reagents are formed together with water-soluble ODSO as a homogeneous aqueous mixture, including a water source, an aluminum source, a silica source, a phosphorus source, an acid medium, an optional structure directing agent and an optional seed material. It is understood that the phosphorus source and the acid medium can be the same, for instance, phosphoric acid. An effective amount of a water-soluble ODSO component is used as an additional component in the co-syntheses processes herein. The water-soluble ODSO component can be in the form of a neat water-soluble ODSO, as an aqueous water-soluble ODSO solution, a mixture with an alkaline source as a pH modified water-soluble ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to co-synthesize one or more crystalline SAPO phases and one or more phases of amorphous silica, amorphous silica and/or amorphous silica-alumina. The eventual framework of the as-made crystalline component depends on various factors including but not limited to the time and/or temperature of hydrothermal reaction; selected structure directing agents (if any); and/or selected seeds. In certain embodiments, inclusion of a water-soluble ODSO shifts a phase boundary of a sol-gel composition to a certain SAPO framework type having an approximately equivalent amount of water being replaced, even using compositional ratios and conditions (other than the water-soluble ODSO) typically effective for synthesis of a different type or sub-type of crystalline material, or that would typically produce amorphous material.

In some embodiments, the crystalline component is metal aluminophosphates (MeAPOs) and precursors and reagents effective for the crystalline material comprise an aluminum source, a metal source, a phosphorus source, an acid medium, an optional structure directing agent and an optional seed material. The present disclosure is applicable to various MeAPOs that are synthesized hydrothermally, which can benefit from inclusion of ODSO components as described herein in the synthesis. Suitable MeAPOs materials include but are not limited to MeAPO sub-types: (AFI) including MeAPO-5; (AFS) including MeAPO-46; (ATN) including MeAPO-39; (ATO) including MeAPO-31; (ATS) including MeAPO-36; or (GIS) including MeAPO-43.

In an embodiment of a method of co-synthesizing one or more MeAPOs and amorphous materials, effective amounts and proportions of precursors and reagents are formed together with water-soluble ODSO as a homogeneous aqueous mixture, including a water source, an aluminum source, a metal source, a phosphorus source, an acid medium, an optional structure directing agent and an optional seed material. It is understood that the phosphorus source and the acid medium can be the same, for instance, phosphoric acid. The metal source can be one or more of Ti, V, Cr, Mn, Fe, Co, Ni, Cu, Zn, Cd or Mg. An effective amount of a water-soluble ODSO component is used as an additional component in the co-syntheses processes herein. The water-soluble ODSO component can be in the form of a neat water-soluble ODSO, as an aqueous water-soluble ODSO solution, a mixture with an alkaline source as a pH modified water-soluble ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to co-synthesize one or more crystalline MeAPO phases and one or more phases of amorphous silica, amorphous silica and/or amorphous silica-alumina. The eventual framework of the as-made crystalline component depends on various factors including but not limited to the time and/or temperature of hydrothermal reaction; selected structure directing agents (if any); and/or selected seeds. In certain embodiments, inclusion of a water-soluble ODSO shifts a phase boundary of a sol-gel composition to a certain MeAPO framework type having an approximately equivalent amount of water being replaced, even using compositional ratios and conditions (other than the water-soluble ODSO) typically effective for synthesis of a different type or sub-type of crystalline material, or that would typically produce amorphous material.

In the above embodiments in which a silica source is used, the silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources include fumed silica commercially available from Cabot and colloidal silica (LUDOX commercially available from Cabot).

In the above embodiments in which an aluminum source is used, the aluminum source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides and alkoxides, aluminum wire and alumina gels. For example, suitable materials as aluminum or alumina sources include commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

In the above embodiments in which a phosphorus source is used, the phosphorus source can comprise, without limitation, one or more of phosphoric acid, phosphoric acid salt, pyrophosphoric acid or phosphorous acid.

In the above embodiments in which a structure directing agent is used, the structure directing agent is selected to influence the target type of crystalline material structure to be formed. Effective structure directing agents that can optionally be added include known or developed structure directing agents for a particular type or sub-type of crystalline material. Effective structure directing agents for zeolites include one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol. For example, in embodiments in which the target zeolite structures are MFI, including ZSM-5, beta zeolite, or mordenite zeolite, suitable structure directing agents include but are not limited to one or more of quaternary ammonium cation compounds (including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds; the cation can be paired with one or more of a hydroxide anion (for example, TPAOH or CTAOH), a bromide anion (for example, TPAB or CTAB), or an iodide anion. In embodiments in which the target zeolite structures are MFI zeolites, including ZSM-5, structure directing agents include but are not limited to one or more of: those identified above for MFI zeolites; bifunctional dicationic molecules containing a long aliphatic chain (for example $C_{22}H_{45}$—$N^+(CH_3)_2$—$C_6H_{12}$—$N^+$ $(CH_3)_2$—$C_6H_{13}$, denoted $C_{22\text{-}6\text{-}6}$, $C_{22}H_{45}$—$N^+(CH_3)_2$—$C_6H_{12}$—$N^+$ $(CH_3)_2$—$C_3H_7$, denoted $C_{22\text{-}6\text{-}3}$, or a poly(ethylene glycol)); dual-porogenic surfactants; silylated polyethylenimine polymers; amphiphilic organosilanes; or hydrophilic cationic polyelectroyltes/polymers such as poly(diallyldimethylammonium chloride) (PDADMAC). In embodiments in which the target zeolite structures are beta zeolites, structure directing agents include but are not limited to one or more of: those identified above for beta zeolite; 4,4'trimethylene bis(N-methyl N-benzyl-piperidinium) hydroxide; 1,2-diazabicyclo 2,2,2, octane (DABCO); dialkylbenzyl ammonium hydroxide; dimethyldiisopropylammonium hydroxide (DMDPOH); N,N-dimethyl-2,6-cis-dimethylpiperdinium hydroxide (DMPOH); N-ethyl-N,N-dimethylcyclohexanaminium hydroxide (EDMCHOH); N,N,N-trimethylcyclohexanaminium hydroxide (TMCHOH); N-isopropyl-N-methyl-pyrrolidinium (iProOH); N-isobutyl-N-methyl-pyrrolidinium (iButOH); N-isopentyl-N-methyl-pyrrolidinium (iPenOH); or any of the thousands of structure directing agents for producing zeolite beta can be used, as disclosed in Daeyaerta et al., "Machine-learning approach to the design of OSDAs for zeolite beta," PNAS February, 116 (2019): 3413-3418. In embodiments in which the target zeolite structures are mordenite zeolite, structure directing agents include but are not limited to one or more of: those identified above for mordenite zeolite; mixed organic templates such as glycerol, ethylene glycol or polyethylene glycol; pyrrolidine-based mesoporogens; piperazine; 1,6-diaminohexane; diethylpiperidinium; or co-operative organic templates such as N,N,N-trimethyl-1,1-adamantammonium and 1,2-hexanediol. In embodiments in which the target zeolite structures are (CHA) zeolite, structure directing agents include but are not limited to one or more of comprising quaternary ammonium cations derived from adamantamine e.g. N,N,N-trimethyl-1-adamantammonium, derived from quinuclidinol e.g. N-methyl-3-quinuclidinol and derived from cyclohexyl/cyclohexylmethyl, e.g. trimethyl(cyclohexylmethyl) ammonium. Structure directing agents that can optionally be added for synthesis of SAPOs, AlPOs or MeAPOs can be one or more known or developed structure directing agents, including but not limited to one or more of secondary and tertiary amine derived templates, quaternary ammonium derived templates, azamacrocycle derived templates, spiro templates, diaazabicyclo derived templates, or phosphazine based templates.

The disclosed process to co-synthesize one or more crystalline phases and one or more phases of amorphous silica, amorphous silica and/or amorphous silica-alumina can occur in the absence or presence of seed materials comprising crystalline structures of the same or similar crystalline framework structure as the target crystalline framework for production, such as a zeolite. For example: for MFI zeolites, suitable seed materials include ZSM-5 (MFI), ZSM-8 (MFI), ZSM-11 (MEL) and Silicalite-1 (MFI); for beta zeolites, other beta zeolites are used as seed materials; for mordenite zeolites, other mordenite zeolites are used as seed materials; for FAU zeolites, suitable seed materials are zeolite Y, zeolite X, USY zeolite, faujasite zeolite or small protozeolitic species (gels); for AlPOs, SAPOs and MeAPOs, suitable seed materials are other AlPOs, SAPOs and MeAPOs. Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "core-shell" mechanism with the seed acting as a core and the target material grows on the surface; and/or where the seeds partially dissolve providing essential building units that can orientate crystallization of the zeolite or other crystalline structure.

In the above embodiments in which a mineralizer is necessary, a hydroxide mineralizer is included as the hydroxide derived from the alkali metal source from the Periodic Table IUPAC Group 1 alkaline metals (and/or from the hydroxide of any hydroxide-containing structure directing agent). For example, these are selected from the group consisting of NaOH, KOH, RbOH, LiOH, CsOH and combinations thereof. In certain embodiments a Na-based hydroxide mineralizer is selected.

The mixing steps typically occur at ambient temperature and pressure (for instance about 20° C. and about 1 standard atmosphere), for a time is sufficient to realize a homogeneous distribution of the components. In certain embodiments the sol-gel can be aged before being subjected to subsequent hydrothermal treatment, for example for a period of about 0-48, 0-24, 0-5, 0.5-24 or 0.5-5 hours. Hydrothermal treatment is then carried out at a temperature in the range of about 90-200, 100-200, 100-180, 100-160, 120-200, 120-180, 120-160 or 140-200° C. and at atmospheric or autogenous pressure (from the sol-gel or from the sol-gel plus an addition of a gas purge into the vessel prior to heating), and for a suitable time period, for example within the range of about 0.1-8, 0.2-8, 0.5-8, 1-8, 0.1-6, 0.2-6, 0.5-6, 1-6, 0.1-4, 0.2-4, 0.5-4 or 1-4 days, to ensure crystallization and formation of a zeolite gel or a gel for other crystalline material. As is known, these time periods and temperatures can vary depending on the desired zeolite or other crystalline material framework to be produced.

The products are washed, for example with water at a suitable quantity, for example at about twice the volume of the sol-gel solution. The wash can be at a temperature of from about 20-80° C. at atmospheric, vacuum or under pressure. The wash can continue until the pH of the filtrate approaches about 7-9 in basic systems, and about 5-7 in acidic systems. The solids are recovered by filtration, for instance, using known techniques such as centrifugation, gravity, vacuum filtration, filter press, or rotary drums, and dried, for example at a temperature of up to about 110-150° C.

In certain embodiments, recovered precipitate is calcined at a suitable temperature, temperature ramp rate and for a suitable period of time. In certain embodiments, calcining is carried out to increase porosity. In certain embodiments, calcining is carried out to remove all or a portion of structure directing agent components that remain in the precipitate to realize porous zeolite. In optional embodiments in which calcination is carried out on the products, conditions for calcination can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

It is to be appreciated by those skilled in the art that in certain embodiments effective baseline compositional ratios for co-synthesis of crystalline materials such as zeolites as disclosed herein can be determined by empirical data, for instance summarized as phase boundary diagrams or other methodologies as is known in material synthesis. In certain embodiments, baseline compositional ratios and conditions are effective, in the absence of water soluble ODSO, for synthesis one type or sub-type of crystalline material (zeolite or other crystalline material), or an amorphous material, and according to certain embodiments of the process herein, inclusion of water soluble ODSO results in shifting the material type out of the phase boundary diagram, even at approximately equivalent ratios, to a different type or sub-type of crystalline material, or an amorphous material.

In embodiments in which the crystalline material is a zeolite, effective ratios of precursors and reagents for production of zeolites herein are within those known to produce templated aluminosilicate zeolites and can be determined by those of ordinary skill in the art. For example, effective amounts of silica and alumina precursors are provided to produce synthesized zeolite having a silica-to-alumina ratio (SAR) in the range of about 2-10000, 2-5000, 2-500, 2-100, 2-80, 10-10000, 10-5000, 10-500, 10-100, 10-80, 50-10000, 50-5000, 50-1000, 50-500 or 50-100. The SAR levels in the synthesized zeolite depends on the type of zeolite; for instance: MFI zeolites including ZSM-5 have effective SAR (mol/mol) values in the synthesized zeolite in the range of about 20-1500, 20-1000, 20-500, 25-1500, 25-1000, 25-500, 50-1500, 50-1000, 50-500, 100-1500, 100-1000 or 100-500; *BEA zeolites and/or MOR zeolites have effective SAR (mol/mol) values in the synthesized zeolite of greater than 10, in certain embodiments in the range of about 10-10000, 10-5000, 10-500, 10-100, 10-80, 50-10000, 50-5000, 50-1000, 50-500 or 50-100; zeolite Y has effective SAR (mol/mol) values in the synthesized zeolite in the range of about 3-6. In embodiments in which a structure directing agent is used, an effective amount includes a molar ratio (normalized to 1 mole of $Al_2O_3$) in the range of about 0.1-75, 0.1-50, 0.1-30, 0.1-20, 0.1-15, 1-75, 1-50, 1-30, 1-20, 1-15, 2.5-75, 2.5-50, 2.5-30, 5-75, 5-50 or 5-30.

In certain embodiments, baseline compositional ratios of the aqueous composition used to produce zeolites herein include (on a molar basis):

$SiO_2/Al_2O_3$: 10-1500
$OH^-/SiO_2$: 0.05-3
$R/SiO_2$: 0-1.5
Alkali metal cation/$SiO_2$: 0.075-1.5
$H_2O/SiO_2$: 5-120
wherein R is the structure directing agent, and a level of 0 represents absence of the structure directing agent.

It is appreciated by those skilled in the art that these molar composition ratios can be expressed on a mass basis.

As is known, different ratios of materials are used depending on the desired zeolite to be produced. In the embodiments herein, ratios of components in homogeneous aqueous mixtures including water soluble ODSO are sometimes referred to as "water soluble ODSO-enhanced compositional ratios." In certain embodiments a water soluble ODSO-enhanced compositional ratio is one in which water soluble ODSO is included to replace an approximately equivalent mass of a certain amount of water in the homogeneous aqueous mixture, and wherein a cumulative amount of water soluble ODSO and water (water soluble ODSO+$H_2O$) is approximately equivalent to a mass of water that is effective to produce the same or another type or sub-type of crystalline material, or an amorphous material, in the absence of water soluble ODSO. In certain embodiments: a baseline compositional ratio of precursors is known or determined to be is effective to produce one type or sub-type of crystalline material, or an amorphous material, in the absence of water soluble ODSO; a water soluble ODSO-enhanced compositional ratio is approximately equivalent to the baseline compositional ratio except for the substitution of water soluble ODSO for water on a mass basis; and wherein the conditions and time of heating the sol-gel having the water soluble ODSO-enhanced compositional ratio is approximately equivalent to those that are effective to produce the same or another type or sub-type of crystalline material, or an amorphous material, in the absence of water soluble ODSO.

Using the method herein, a starting component to produce composite catalyst particles can be produced from the co-synthesized precipitate of crystalline material and amorphous material. Composite catalyst particles produced herein can be used as catalyst particles themselves if the crystalline material and/or amorphous material is catalytically active for a particular use. Moreover, the ratio of crystalline to amorphous material that is controlled herein is tailored for a specific use. The amorphous component can serve as a binder. Composite catalyst particles produced herein can be subject to one or more post-treatments to alter catalytic activity as is known. Composite catalyst particles produced herein can be loaded with one or more active components for a particular use. In a process to produce composite catalyst particles according to an aspect of the disclosure, co-synthesized amorphous material and crystalline material as described herein is used as a starting material. In certain embodiments the co-synthesized amorphous material and crystalline material is subjected to calcining as described herein. In certain embodiments the co-synthesized amorphous material and crystalline material is used without calcining (as calcination is typically carried out in subsequence catalyst forming steps). The co-synthesized amorphous material and crystalline material is mixed and kneaded, typically with an effective amount of water for instance, at a liquid/solid mass ratio range of about 20-90, 30-90, 40-90, 30-90, 30-80 or 30-70, for an effective time, for instance in a range of about 10-180, 30-180 or 60-180 minutes, to form a composite paste. The composite paste is formed into catalyst particles by extrusion, for instance through a die with perforations. The extrudate is dried, calcined, and broken into short pieces. The typical length to diameter ratio of the catalyst base varies, for instance, between 2 and 4.

The present disclosure includes one or more water-soluble ODSO compounds including ODSO compounds that are used as a component in a material synthesis process, wherein supernatant containing one or more ODSO components. The additional components can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

As disclosed herein, in certain embodiments a water-soluble ODSO component includes a pH-modified water-soluble ODSO composition can be used. Such a pH-modified water-soluble ODSO composition is disclosed in U.S.

patent application Ser. Nos. 17/850,158 and 17/850,115 filed on Jun. 27, 2022, hereinabove incorporated by reference. The pH-modified water-soluble ODSO composition comprises an acidic water-soluble ODSO composition and an alkaline agent. In certain embodiments, the pH-modified WS-ODSO composition provides a portion of requisite water to form the aqueous mixture. In certain embodiments, the pH-modified WS-ODSO composition provides sufficient water to avoid added utility water. In certain embodiments, the pH-modified WS-ODSO composition provides a portion of requisite mineralizer to homogeneous aqueous mixture to produce zeolite. In certain embodiments, the alkaline agent is selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, lithium hydroxide, zinc hydroxide, trimethylamine, pyridine, beryllium hydroxide, magnesium hydroxide, and combinations of one of the foregoing alkaline agents. In certain embodiments, the alkaline agent is selected from the group consisting of sodium hydroxide, potassium hydroxide, rubidium hydroxide, lithium hydroxide, cesium hydroxide, and combinations of one of the foregoing alkaline agents.

As disclosed herein, in certain embodiments a water-soluble ODSO component includes supernatant from a prior synthesis that utilized water-soluble ODSO. Such a process is disclosed in U.S. patent application Ser. No. 17/850,285 filed on Jun. 27, 2022, hereinabove incorporated by reference. In such a process, a first synthesis of a first material is carried out using water soluble ODSO as a component (as-is, or as a pH modified composition). All or a portion of a precipitate is separated from a supernatant, and that supernatant from an ODSO synthesis is used as a water-soluble ODSO component herein. In certain embodiments, the supernatant from an ODSO-enhanced synthesis provides a portion of requisite water to form the aqueous mixture. In certain embodiments, the supernatant from an ODSO-enhanced synthesis provides sufficient water to avoid added utility water. In certain embodiments, the supernatant from an ODSO-enhanced synthesis provides a portion of requisite mineralizer to homogeneous aqueous mixture to produce zeolite.

In certain embodiments the alkali metal source in the overall sol-gel, whether provided from the ODSO or from a separate mineralizer, is provide as a hydroxide, but in embodiments herein where the ratio is expressed based on the mass of the alkali, it may be expressed based on metal itself. For instance, when the alkali is NaOH, the ODSO/Na ratio is determined by dividing the mass of the ODSO by the mass of the Na portion of NaOH, that is, about 57.5% of the NaOH mass.

In certain embodiments, the alkali metal source comprises sodium, the co-synthesized crystalline material is zeolite Y, and an effective amount of ODSO is a mass ratio of ODSO to sodium from the alkali metal source in the range of about 1.9-2.4. In certain embodiments, the alkali metal source comprises sodium, the co-synthesized crystalline material is MFI zeolite (ZSM-5) with a silica-to-alumina ratio of about 100, and an effective amount of ODSO is a mass ratio of ODSO to sodium from the alkali metal source in the range of about 8.7-8.9. In certain embodiments, the alkali metal source comprises sodium, the co-synthesized crystalline material is MFI zeolite and a mass ratio of ODSO to sodium from the alkali metal source is in the range of about 7.9-8.9. In certain embodiments, the alkali metal source comprises sodium, the co-synthesized crystalline material is MFI zeolite (ZSM-5) with a silica-to-alumina ratio of about 25, and an effective amount of ODSO is a mass ratio of ODSO to sodium from the alkali metal source in the range of about 7.9-8.5. It is noted that various factors can contribute to quantity of ODSO, including the type of zeolite formed, the ratios of other components, and the amount of mineralizer. In certain embodiments for certain zeolite syntheses, the basic components from all of the sources are provided in effective amounts so as to maintain the homogeneous mixture at a pH level of greater than or equal to about 9, for example in the range of about 9-14, 9-13, 10-14, 10-13, 11-14 or 11-13. In certain embodiments for certain AlPO syntheses, the components are provided in effective amounts so as to maintain the homogeneous mixture at a pH level in the range of about 2-14, 2.5-14, 2-13.5 or 2.5-13.5. In certain embodiments for certain MeAPO syntheses, the components are provided in effective amounts so as to maintain the homogeneous mixture at a pH level in the range of about 2.5-13, 3.0-13, 2.5-12.6 or 3.0-12.6. In certain embodiments for certain SAPO syntheses, the components are provided in effective amounts so as to maintain the homogeneous mixture at a pH level in the range of about 5.5-13.5, 5.5-13.0, 6.0-13.5 or 6.0-13.0. It is appreciated that the overall pH is influenced by anions from the ODSO component as a pH-modified ODSO composition, an optional hydroxide mineralizer source, and in certain embodiments anions from other sources such as from an aluminum source or a silica source. In certain embodiments hydroxide anions are provided from the ODSO, an optional mineralizer from an alkali metal source and an optional structure directing agent. In the process herein, the pH is reduced by the presence of ODSO, therefore, the quantity of the basic compound from one or more of the aforementioned sources can be adjusted accordingly to attain the requisite pH.

In certain embodiments, the one or more ODSO compounds are contained in a mixture with one or more catalytically active components and ODSO, as an active component carrier composition (as disclosed in co-pending and commonly owned U.S. application Ser. No. 17/720,434 filed Apr. 14, 2022, entitled "Active Component Carrier Composition, and Method for Manufacture of Catalyst Materials," which is incorporated by reference herein in its entirety). One or more catalytically active components are included in a mixture with one or more ODSO compounds. The one or more active components can vary, depending upon the application of the catalyst being manufactured. The active component can be a metal or a non-metal, in elemental form or as a compound such as oxides, carbides or sulfides. For instance, one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, the produced aqueous liquid mixture comprises one or more ODSO compounds that are contained in reaction products, or a fraction of reaction products, derived from controlled catalytic oxidation of disulfide oil compounds in the presence of an oxidation catalyst containing one or more transition metals. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-10 or from Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo, W, V, Ti, and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate)dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments ODSO is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are C1-C10 alkyl or C6-C10 aryl groups. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In embodiments herein the water-soluble compounds and water-insoluble compounds are separated from one another, and the ODSO used herein comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments ODSO used herein comprises, consists of or consists essentially of at least one ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments ODSO used herein comprises, consists of or consists essentially of a mixture or two or more ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments ODSO used herein comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are C1-C10 alkyl or C6-C10 aryl groups. In certain embodiments, the R and R' are methyl and/or ethyl groups. In certain embodiments, the WS-ODSO compound(s) used herein have 1 to 20 carbon atoms.

In certain embodiments, the ODSO compounds used herein comprise, consist of or consist essentially of ODSO compounds having an average density greater than about 1.0 g/cc. In certain embodiments, the ODSO compounds used herein comprise, consist of or consist essentially of ODSO compounds having an average boiling point greater than about 80° C. In certain embodiments, the ODSO compounds used herein comprise, consist of or consist essentially of ODSO compounds having a dielectric constant that is less than or equal to 100 at 0° C.

Table 1 includes examples of polar ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the ODSO are derived from oxidation of DSO compounds present in an effluent refinery hydrocarbon stream recovered following the catalytic oxidation of mercaptans present in the hydrocarbon stream. In some embodiments, the DSO compounds are oxidized in the presence of a catalyst. The effluent hydrocarbon stream recovered following the catalytic oxidation of mercaptans present in the hydrocarbon stream generally a mixture of ODSO compounds as described herein and sulfur compounds including sulfonic acids, for example methane sulfonic acid, ethane sulfonic acid, or an alkyl sulfonic acid (the alkyl group being based on the R group of the DSO being oxidized.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O_2 \rightarrow \tfrac{1}{2}RSSR + \tfrac{1}{2}H_2O \tag{1}$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2R'SH + 2RSH + O_2 \rightarrow 2R'SSR + 2H_2O \tag{2}$$

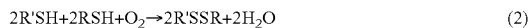

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 2, with similar references numbers representing similar units/feeds. In FIG. 3, the effluent stream 1007 from the generalized MEROX unit of FIG. 2 is treated. It will be understood that the processing of the mercaptan containing hydrocarbon stream of FIG. 2 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

The below examples and data are exemplary. It is to be understood that other ratios and types of aluminum sources, silica sources, bases and structure directing agents can be used as compared to the examples.

Figure 3A:
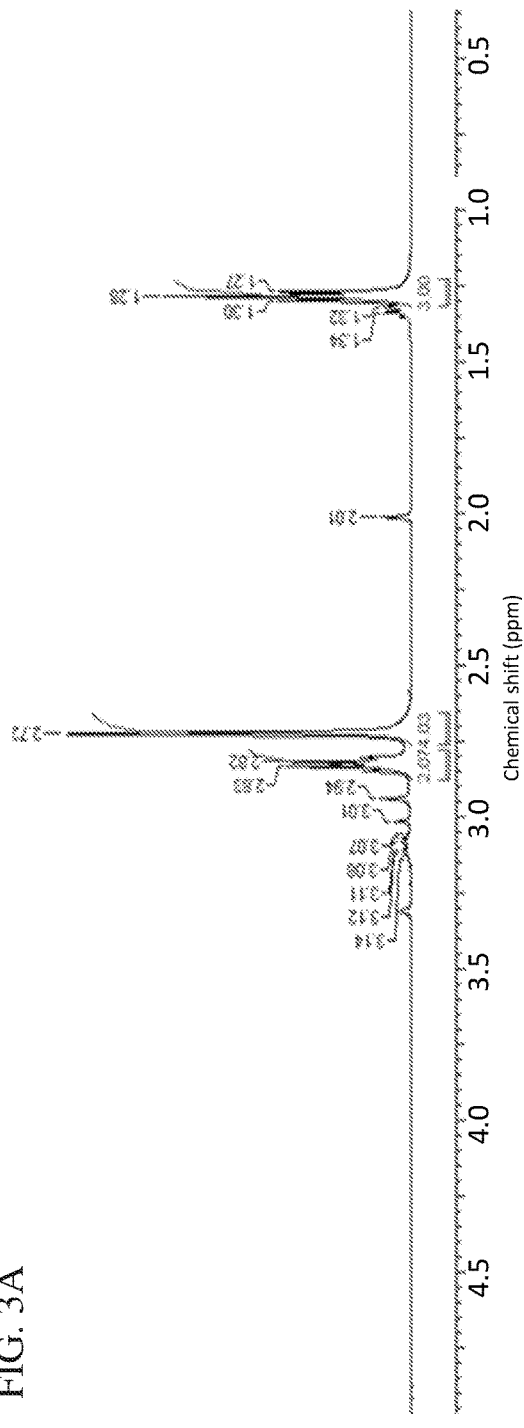
FIGS. 3A and 3B are nuclear magnetic resonance spectra of the ODSO fraction used in examples herein
Figure 3B:
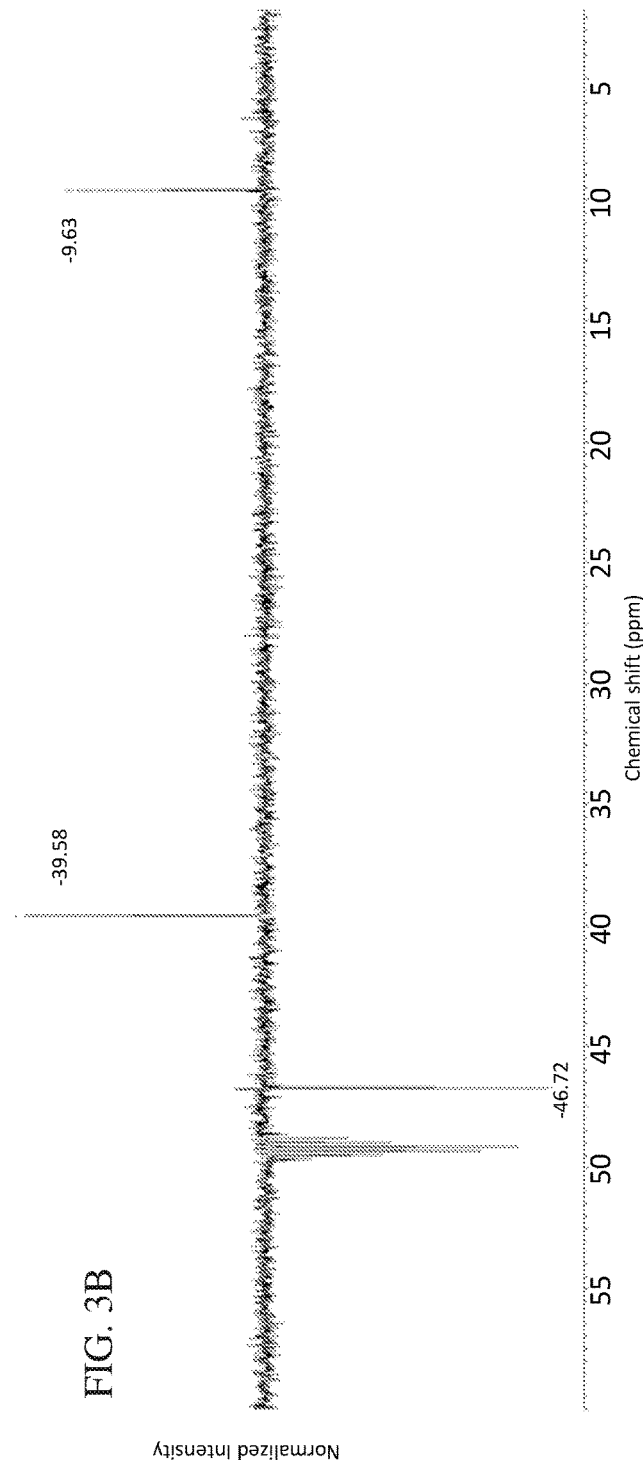

Reference Example: The ODSO mixture used in the Example below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon monosulfur content) was 2.90. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental 13C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental 13C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form the ODSO composition used in the present examples.

Example 1A (Comparative): Precursors were used for synthesis of zeolite Y in a comparative example, in the absence of ODSO (ODSO/Na=0). A quantity of 0.8677 g of aluminum isopropoxide was weighed in a polytetrafluoroethylene (PTFE) liner (45 ml). Thereafter, 2.6679 g of a 50 wt. % sodium hydroxide solution and 11.7745 g of distilled water were added and the mixture was maintained under stirring until the Al source dissolved. A quantity of 3.1256 g of the silica source (40 wt. % $SiO_2$) was added and the mixture stirred until homogeneous. The mixture was left to age for 24 hours at room temperature under constant stirring. The PTFE liner was positioned within an autoclave and transferred to an oven and heated to a temperature of 100° C. whilst rotating the autoclave. The autoclave was maintained at isothermal conditions for 12 hours. The product was filtered and washed with distilled water before drying at 110° C. The dry mass was 0.9083 g. The XRD pattern (FIG. 4) shows the product to be crystalline zeolite Y.

Example 1B: ODSO as described in the Reference Example was added to the homogeneous aqueous mixture to replace an approximately equivalent amount of water as in the comparative Example 1A, at an ODSO/Na ratio of about 1.85. Ratios of other components are approximately equivalent to those in the comparative Example 1A.

A quantity of 0.8675 g of aluminum isopropoxide was weighed in a 45 mL PTFE liner; thereafter, 2.6617 g of a 50 wt. % sodium hydroxide solution, 10.3620 g of distilled water and 1.4133 g of ODSO were added and the mixture was maintained under stirring until the Al source dissolved. A quantity of 3.1269 g of the silica source (40 wt. % $SiO_2$) was added and the mixture stirred until homogeneous. The mixture was left to age for 24 hours at room temperature under constant stirring. The PTFE liner was positioned within an autoclave and transferred to an oven and heated to a temperature of 100° C. whilst rotating the autoclave. The autoclave was maintained at isothermal conditions for 12 hours. The product was filtered and washed with distilled water before drying at 110° C. The dry mass was 0.8529 g. The XRD pattern (FIG. 4) shows the product to be crystalline zeolite Y.

Example 1C: ODSO as described in the Reference Example was added to the homogeneous aqueous mixture to replace an approximately equivalent amount of water as in the comparative Example 1A, at an ODSO/Na ratio of about 2.00. Ratios of other components are approximately equivalent to those in the comparative Example 1A.

A quantity of 0.8670 g of aluminum isopropoxide was weighed in a 45 mL PTFE liner; thereafter, 2.6666 g of a 50 wt. % sodium hydroxide solution, 10.2440 g of distilled water and ODSO 1.5306 g of were added and the mixture was maintained under stirring until the Al source dissolved. A quantity of 3.1294 g of the silica source (40 wt. % $SiO_2$) was added and the mixture stirred until homogeneous. The mixture was left to age for 24 hours at room temperature under constant stirring. The PTFE liner was positioned within an autoclave and transferred to an oven and heated to a temperature of 100° C. whilst rotating the autoclave. The autoclave was maintained at isothermal conditions for 12 hours. The product was filtered and washed with distilled water before drying at 110° C. The dry mass was 0.9941 g. The XRD pattern (FIG. 4) shows a major portion of the product to be crystalline zeolite Y and a minor portion of the product to be amorphous alumina and/or amorphous silica-alumina.

Example 1D: ODSO as described in the Reference Example was added to the homogeneous aqueous mixture to replace an approximately equivalent amount of water as in the comparative Example 1A, at an ODSO/Na ratio of about 2.15. Ratios of other components are approximately equivalent to those in the comparative Example 1A.

A quantity of 0.8673 g of aluminum isopropoxide was weighed in a 45 mL PTFE liner; thereafter, 2.6648 g of a 50 wt. % sodium hydroxide solution, 10.1260 g of distilled water and 1.6488 g of ODSO were added and the mixture was maintained under stirring until the Al source dissolved. A quantity of 3.1250 g of the silica source (40 wt. % $SiO_2$) was added and the mixture stirred until homogeneous. The mixture was left to age for 24 hours at room temperature under constant stirring. The PTFE liner was positioned within an autoclave and transferred to an oven and heated to a temperature of 100° C. whilst rotating the autoclave. The autoclave was maintained at isothermal conditions for 12 hours. The product was filtered and washed with distilled water before drying at 110° C. The dry mass was 0.9396 g. The XRD pattern (FIG. 4) shows a major portion of the product to be crystalline zeolite Y and a minor portion of the product to be amorphous alumina and/or amorphous silica-alumina.

Example 1E: ODSO as described in the Reference Example was added to the homogeneous aqueous mixture to replace an approximately equivalent amount of water as in the comparative Example 1A, at an ODSO/Na ratio of about 2.31. Ratios of other components are approximately equivalent to those in the comparative Example 1A.

A quantity of 0.8678 g of aluminum isopropoxide was weighed in a 45 mL PTFE liner; thereafter, 2.6646 g of a 50 wt. % sodium hydroxide solution, 10.0084 g of distilled water and 1.7653 g of ODSO were added and the mixture was maintained under stirring until the Al source dissolved. A quantity of 3.1259 g of the silica source (40 wt. % $SiO_2$) was added and the mixture stirred until homogeneous. The mixture was left to age for 24 hours at room temperature under constant stirring. The PTFE liner was positioned within an autoclave and transferred to an oven and heated to a temperature of 100° C. whilst rotating the autoclave. The autoclave was maintained at isothermal conditions for 12 hours. The product was filtered and washed with distilled water before drying at 110° C. The dry mass was 0.9905 g. The XRD pattern (FIG. 4) shows a major portion of the product to be amorphous alumina and/or amorphous silica-alumina, and a minor portion of the product to be crystalline zeolite Y.

Example 1F: ODSO as described in the Reference Example was added to the homogeneous aqueous mixture to replace an approximately equivalent amount of water as in the comparative Example 1A, at an ODSO/Na ratio of about 2.46. Ratios of other components are approximately equivalent to those in the comparative Example 1A.

A quantity of 0.8674 g of aluminum isopropoxide (0.8674 g) was weighed in a 45 mL PTFE liner; thereafter, 2.6658 g of a 50 wt. % sodium hydroxide solution, 9.8910 g of distilled water and 1.8820 g of ODSO were added and the mixture was maintained under stirring until the Al source dissolved. A quantity of 3.1290 g of the silica source (40 wt. % $SiO_2$) was added and the mixture stirred until homogeneous. The mixture was left to age for 24 hours at room temperature under constant stirring. The PTFE liner was positioned within an autoclave and transferred to an oven and heated to a temperature of 100° C. whilst rotating the autoclave. The autoclave was maintained at isothermal conditions for 12 hours. The product was filtered and washed with distilled water before drying at 110° C. The dry mass was 1.1064 g. The XRD pattern (FIG. 4) shows the product to be amorphous alumina and/or amorphous silica-alumina.

Synthesis of FAU zeolite including zeolite Y is disclosed in commonly owned U.S. patent application Ser. No. 17/720,072 filed on Apr. 13, 2022, entitled "Method for Manufacture of Faujasite Zeolite Including Zeolite Y in the Presence of ODSO," and U.S. patent application Ser. No. 17/720,108 filed on Apr. 13, 2022, entitled "Method to Tailor Silica-to-Alumina Ratio" which are both incorporated by reference herein in their entireties. In the present disclosure it is demonstrated that the ratio of crystalline zeolite Y to amorphous material can be tailored based on the relative content ODSO in the sol-gel.

Figure 4:
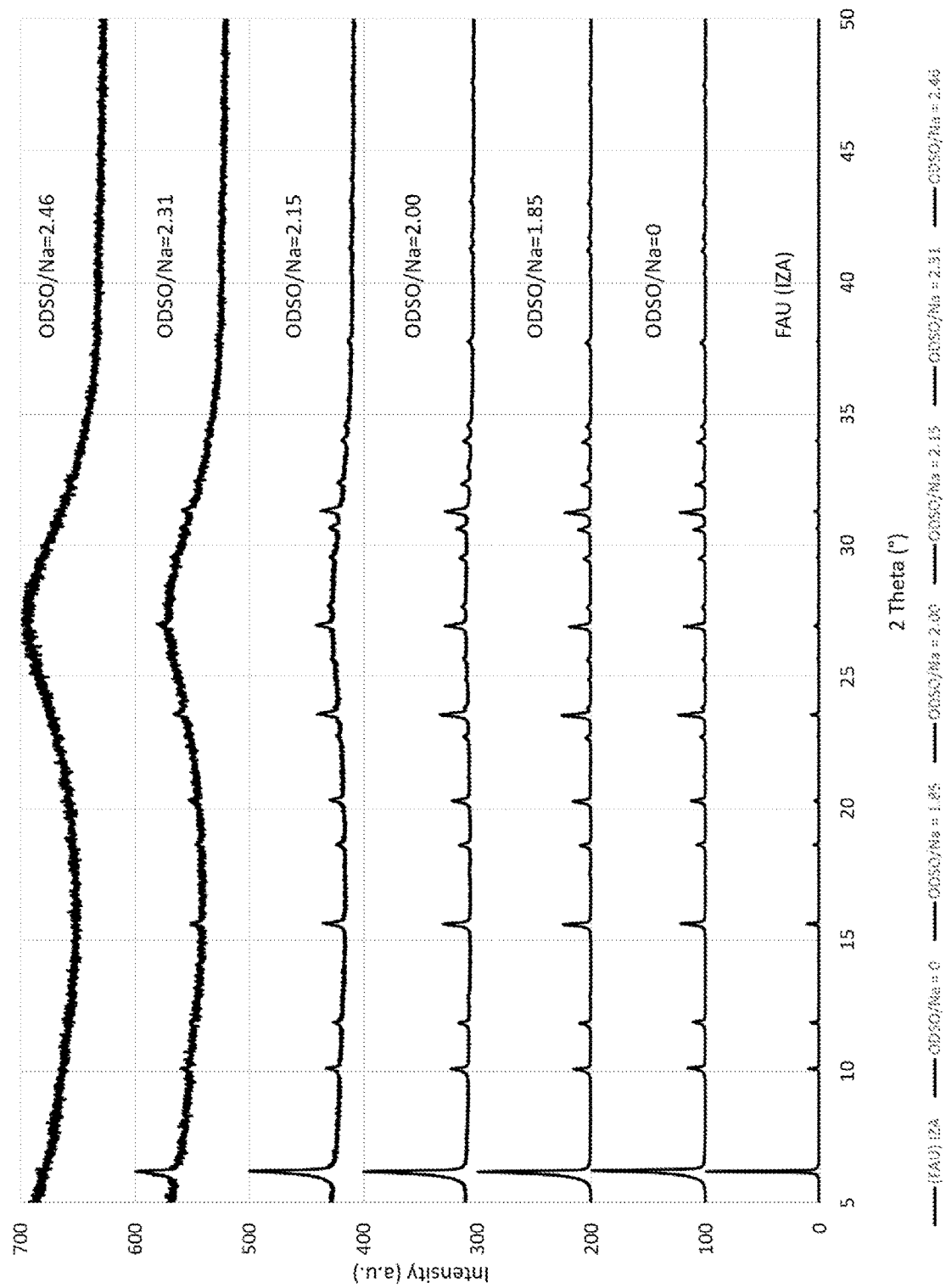
FIG. 4 shows X-ray diffraction (XRD) patterns of the as-made products (prior to calcination) from the Examples 1A-1F.

FIG. 4 shows XRD patterns of Examples 1A-1F, where each pattern is offset on the y-axis by an equivalent amount for clarity, and where the XRD patterns are normalized to the highest intensity peak. The bottom pattern is a simulated (FAU) pattern from the IZA. It is clear that there is a transition from crystalline zeolite Y having the (FAU) framework transitioning through to a zeolite Y-amorphous mixture at varying ratios, and finally to an amorphous material only.

Example 2A (Comparative): Precursors were used for synthesis of MFI zeolite (ZSM-5) in a comparative example with a sol-gel silica-to-alumina ratio of 100, and in the absence of ODSO (ODSO/Na=0). A quantity of 0.2633 g of aluminum nitrate nonahydrate was weighed into a 45 ml PTFE liner. Thereafter, 0.7750 g of a 50 wt. % sodium hydroxide solution and 7.0469 g of a 20 wt. % tetrapropylammonium hydroxide (TPAOH) solution were added and the mixture stirred. Next, 3.3005 g of distilled water was added and the mixture was maintained under stirring. A quantity of 5.2430 g of the silica source (40 wt. % $SiO_2$) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 1.3906 g. The inorganic content determined by thermogravimetric analysis (TGA) was 87.87%, hence, the total zeolite yield was 1.2207 g. The XRD pattern (FIG. 5) shows the product to be crystalline ZSM-5 zeolite.

Example 2B: ODSO as described in the Reference Example was added to the homogeneous aqueous mixture to replace an approximately equivalent amount of water as in the comparative Example 2A, at an ODSO/Na ratio of about 5.31 (based on Na from the mineralizer). Ratios of other components are approximately equivalent to those in the comparative Example 2A.

A quantity of 0.2643 g of aluminum nitrate nonahydrate was weighed in a 45 mL PTFE liner; thereafter, 0.7888 g of a 50 wt. % sodium hydroxide solution and 7.0383 g of a 20 wt. % TPAOH solution were added, and the mixture stirred. Next, 2.2038 g of distilled water and 1.2033 g of ODSO were added and the mixture was maintained under stirring. A quantity of 5.2384 g of the silica source (40 wt. % $SiO_2$) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 2.1103 g. The inorganic content determined by thermogravimetric analysis (TGA) was 86.42%, hence, the total zeolite yield was 1.8237 g. The XRD pattern (FIG. 5) shows the product to be crystalline ZSM-5 zeolite.

Example 2C: ODSO as described in the Reference Example was added to the homogeneous aqueous mixture to replace an approximately equivalent amount of water as in the comparative Example 2A, at an ODSO/Na ratio of about 8.79. Ratios of other components are approximately equivalent to those in the comparative Example 2A.

A quantity of 0.2603 g of aluminum nitrate nonahydrate was weighed in a 45 mL PTFE liner; thereafter, 0.7450 g of a 50 wt. % sodium hydroxide solution and 7.0245 g of a 20 wt. % TPAOH solution were added, and the mixture stirred. Next, 1.3957 g of distilled water and 1.8823 g of ODSO were added and the mixture was maintained under stirring. A quantity of 5.2234 g of the silica source ($SiO_2$ content of 40 wt. %) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 2.5154 g. The inorganic content determined by thermogravimetric analysis (TGA) was 83.09%, hence, the total zeolite yield was 2.0900 g. The XRD pattern (FIG. 5) shows a major portion of the product to be amorphous alumina and/or amorphous silica-alumina and a minor portion of the product to be ZSM-5 zeolite.

Example 2D: ODSO as described in the Reference Example was added to the homogeneous aqueous mixture to replace an approximately equivalent amount of water as in the comparative Example 2A, at an ODSO/Na ratio of about 9.00. Ratios of other components are approximately equivalent to those in the comparative Example 2A.

A quantity of 0.2599 g of aluminum nitrate nonahydrate was weighed in a 45 mL PTFE liner; thereafter, 0.7446 g of a 50 wt. % sodium hydroxide solution and 7.0206 g of a 20 wt. % TPAOH solution were added, and the mixture stirred. Next, 1.3529 g of distilled water and 1.9267 g of ODSO were added and the mixture was maintained under stirring. A quantity of 5.2204 g of the silica source ($SiO_2$ content of 40 wt. %) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 2.4861 g. The inorganic content determined by thermogravimetric analysis (TGA) was 86.37%, hence, the total zeolite yield was 2.1472 g. The XRD pattern (FIG. 5) shows the product to be amorphous silica and/or amorphous silica-alumina.

Synthesis of ZSM-5 zeolite is disclosed in commonly owned U.S. patent application Ser. No. 17/493,206 filed on Oct. 4, 2021, entitled "Method for Manufacture of a Modified ZSM-5 Zeolite in the Presence of ODSO" which is incorporated by reference herein in its entirety. In the present disclosure it is demonstrated that the ratio of crystalline ZSM-5 to amorphous material can be tailored based on the relative content ODSO in the sol-gel.

Figure 5:
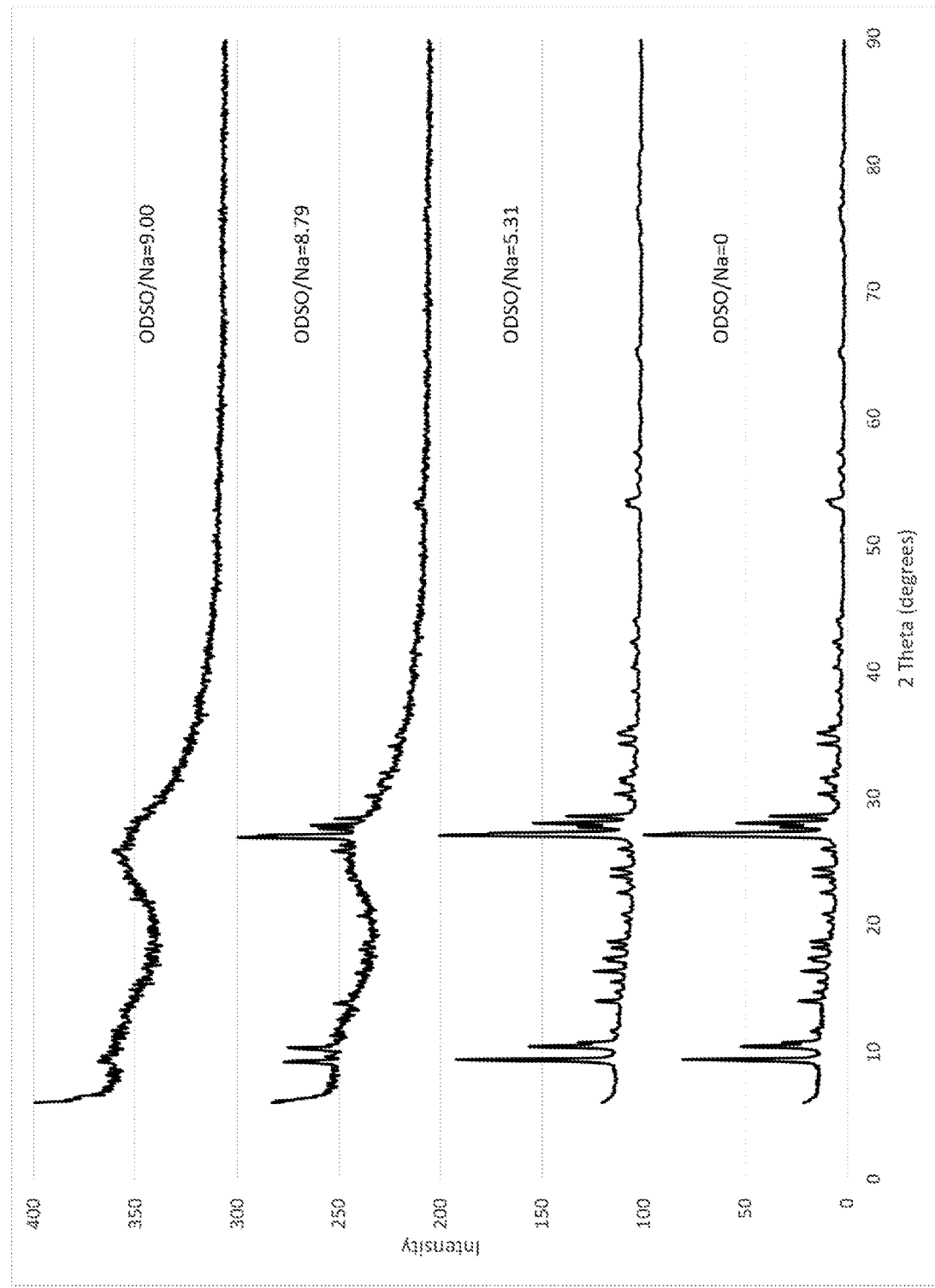
FIG. 5 shows XRD patterns of the as-made products from the Examples 2A-2D.

FIG. 5 shows XRD patterns of Examples 2A-2D, where each pattern is offset on the y-axis by an equivalent amount for clarity, and where the XRD patterns are normalized to the highest intensity peak. It is clear that there is a transition from ZSM-5 zeolite transitioning through to a ZSM-5-amorphous mixture at varying ratios, and finally to an amorphous material only.

Example 3A (Comparative): Precursors were used in a synthesis in a comparative example, in the absence of ODSO (ODSO/Na=0). A quantity of 0.2683 g of aluminum nitrate nonahydrate was weighed into a 45 ml PTFE liner. Thereafter, 0.7511 g of a 50 wt. % sodium hydroxide solution and 7.0193 g of a 20 wt. % tetrapropylammonium hydroxide (TPAOH) solution were added and the mixture stirred. Next, 5.6160 g of distilled water was added and the mixture was maintained under stirring. A quantity of 1.3051 g of the silica source ($SiO_2$ content of 40 wt. %) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.155 g. While the ratio of sol-gel components targeted a ZSM-5 zeolite with a silica-to-alumina ratio of about 25, the XRD pattern (FIG. 6) shows the product to be analcime (ANA).

Example 3B: ODSO as described in the Reference Example was added to the homogeneous aqueous mixture to replace an approximately equivalent amount of water as in the comparative Example 3A, at an ODSO/Na ratio of about 6.92. Ratios of other components are approximately equivalent to those in the comparative Example 3A, targeting a ZSM-5 zeolite with a silica-to-alumina ratio of about 25.

A quantity of 0.2645 g of aluminum nitrate nonahydrate was weighed in a 45 mL PTFE liner; thereafter, 0.7452 g of a 50 wt. % sodium hydroxide solution and 7.0287 g of a 20 wt. % TPAOH solution were added, and the mixture stirred. Next, 4.1334 g of distilled water and 1.4820 g of ODSO were added and the mixture was maintained under stirring. A quantity of 1.3066 g of the silica source ($SiO_2$ content of 40 wt. %) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.4938 g. The XRD pattern (FIG. 6) shows the product to be crystalline ZSM-5 zeolite.

Example 3C: ODSO as described in the Reference Example was added to the homogeneous aqueous mixture to replace an approximately equivalent amount of water as in the comparative Example 3A, at an ODSO/Na ratio of about 8.22. Ratios of other components are approximately equivalent to those in the comparative Example 3A, targeting a ZSM-5 zeolite with a silica-to-alumina ratio of about 25.

A quantity of 0.2664 g of aluminum nitrate nonahydrate was weighed in a 45 mL PTFE liner; thereafter, 0.7426 g of a 50 wt. % sodium hydroxide solution and 7.0270 g of a 20 wt. % TPAOH solution were added, and the mixture stirred. Next, 3.8638 g of distilled water and 1.7539 g of ODSO were added and the mixture was maintained under stirring. A quantity of 1.3030 g of the silica source ($SiO_2$ content of 40 wt. %) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.5101 g. The XRD pattern (FIG. 6) shows the product to be to be amorphous silica and crystalline ZSM-5 zeolite.

Example 3D: ODSO as described in the Reference Example was added to the homogeneous aqueous mixture to replace an approximately equivalent amount of water as in the comparative Example 3A, at an ODSO/Na ratio of about 8.79. Ratios of other components are approximately equivalent to those in the comparative Example 3A, targeting a ZSM-5 zeolite with a silica-to-alumina ratio of about 25.

A quantity of 0.2663 g of aluminum nitrate nonahydrate was weighed in a 45 mL PTFE liner; thereafter, 0.7475 g of a 50 wt. % sodium hydroxide solution and 7.0212 g of a 20 wt. % TPAOH solution were added, and the mixture stirred. Next, 3.7292 g of distilled water and 1.8874 g of ODSO were added and the mixture was maintained under stirring. A quantity of 1.3055 g of the silica source ($SiO_2$ content of 40 wt. %) was added and the mixture stirred until homogeneous. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.4531 g. The XRD pattern (FIG. 6) shows the product to be to be amorphous silica.

Synthesis of low silica-to-alumina ZSM-5 zeolite is disclosed in commonly owned U.S. patent application Ser. No. 17/720,123 filed on Apr. 13, 2022, entitled "Method for Manufacture of Low Silica MFI Framework Zeolite in the Presence of ODSO" which is incorporated by reference herein in its entirety. In the present disclosure it is demonstrated that the ratio of low silica-to-alumina crystalline ZSM-5 to amorphous material can be tailored based on the relative content ODSO in the sol-gel.

Figure 6:
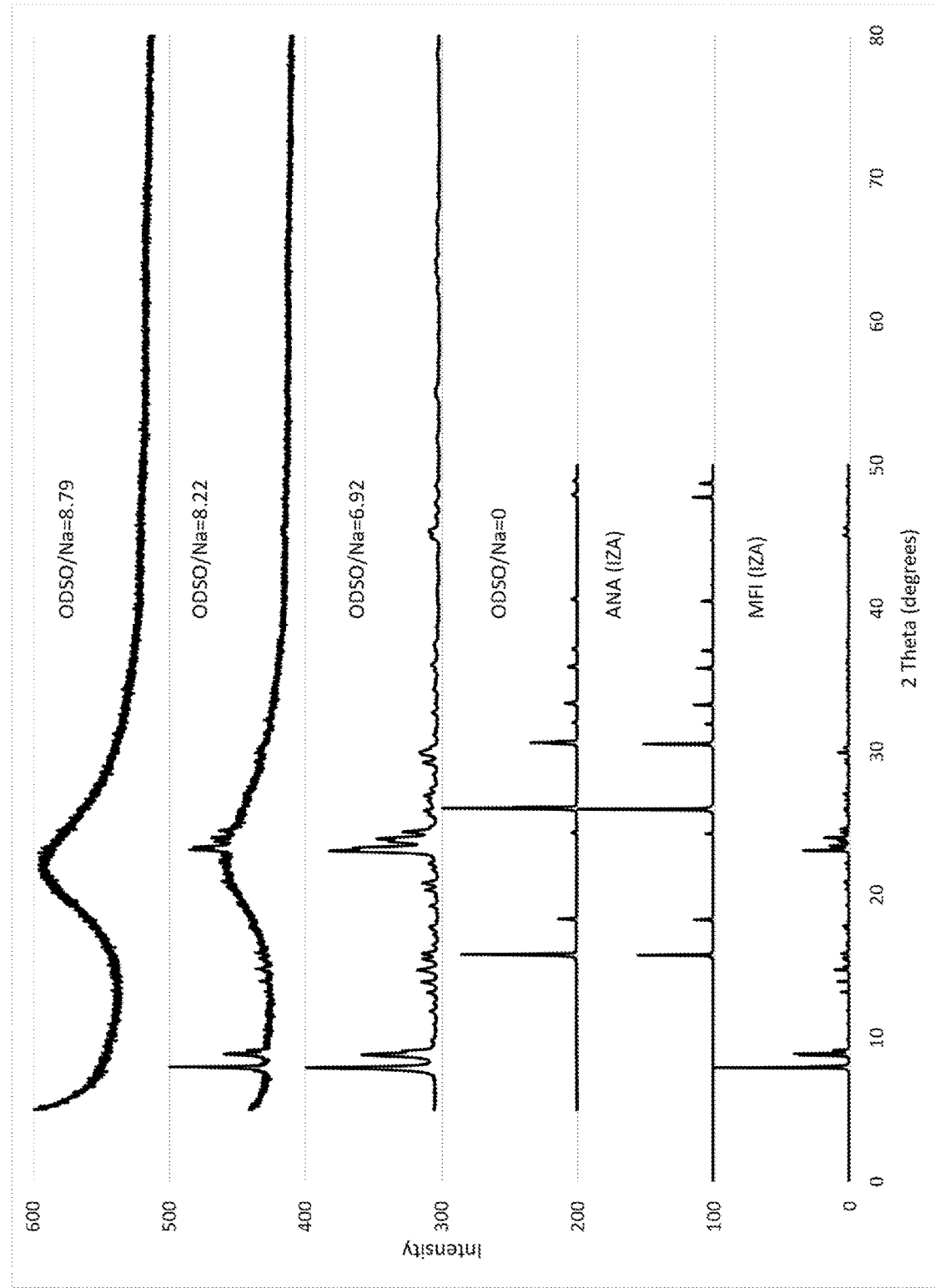
FIG. 6 shows XRD patterns of the as-made products from the Examples 3A-3D.

FIG. 6 shows XRD patterns of Examples 3A-3D, where each pattern is offset on the y-axis by an equivalent amount for clarity, and where the XRD patterns are normalized to the highest intensity peak. The bottom patterns are simulated MFI (ZSM-5) and ANA patterns from the IZA. It is clear that there is a transition from ANA zeolite, to ZSM-5 zeolite, transitioning through to a ZSM-5-amorphous mixture at varying ratios, and finally to an amorphous material only.

The three-letter codes used throughout herein correspond to the framework types established by the International Zeolite Association (IZA), unless otherwise designated.

As used herein, "approximately equivalent" as concerning the amount of ODSO that replaces water, the cumulative amount of ODSO and water, the component molar or mass ratios, and/or the hydrolysis conditions and time, is within a margin of less than or equal to plus or minus 1, 2, 5 or 10% of the compared value.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | 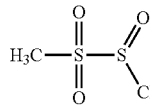<br>1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 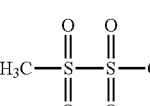<br>1,2-Dimethyldisulfane 1,1,2,2-tetraoxide |

TABLE 1-continued

| ODSO Name | Formula | Structure Examples |
|---|---|---|
| Alkyl-sulfoxidesulfonate | (R—SO—SOO—OH) | $H_3C-S(=O)-S(=O)_2-OH$<br>Methylsulfanesulfonic acid oxide |
| Alkyl-sulfonesulfonate | (R—SOO—SOO—OH) | $H_3C-S(=O)_2-S(=O)_2-OH$<br>1-Hydroxy-2-methyldisulfane 1,1,2,2-tetraoxide |
| Alkyl-sulfoxidesulfinate | (R—SO—SO—OH) | $H_3C-S(=O)-S(=O)-OH$<br>1-Hydroxy-2-methyldisulfane 1,2-dioxide |
| Alkyl-sulfonesulfinate | (R—SOO—SO—OH) | $H_3C-S(=O)_2-S(=O)-OH$<br>Methylsulfanesulfinic acid dioxide |

R and R' can be the same or different C1-C10 alkyl or C6-C10 ary.

What is claimed is:

1. A method to co-synthesize amorphous material and crystalline material comprising:
   forming a homogeneous aqueous mixture of precursors and reagents effective for a crystalline material and/or an amorphous material, water and an effective amount of water-soluble oxidized disulfide oil (ODSO); and
   heating the homogeneous aqueous mixture under conditions and for a time effective to form a precipitate suspended in a supernatant as an intermediate suspension, wherein the precipitate comprises crystalline material and amorphous material.

2. The method of claim 1, wherein the crystalline material comprises about 0.1-99.9 percent by mass of the precipitate and wherein at least a portion of remaining precipitate comprises amorphous material.

3. The method of claim 1, wherein the amorphous material comprises one or more of silica, alumina or silica-alumina.

4. The method as in claim 1, wherein the crystalline material comprises a crystalline aluminosilicate zeolite, and wherein the precursors and reagents comprise a silica source, an aluminum source, an alkali metal source, an optional structure directing agent and an optional seed material.

5. The method as in as in claim 4, wherein the alkali metal source is sodium, and wherein:
   the crystalline aluminosilicate comprises zeolite Y and a mass ratio of ODSO to sodium from the alkali metal source is in the range of about 1.9-2.4; or
   the crystalline aluminosilicate comprises MFI zeolite and a mass ratio of ODSO to sodium from the alkali metal source is in the range of about 7.9-8.9; and
   wherein increased mass ratio of ODSO to sodium within the ranges increases a relative amount of amorphous material in the precipitate.

6. The method as in claim 4, wherein the structure directing agent is used to stabilize the structure of the crystalline aluminosilicate.

7. The method as in claim 6, wherein the structure directing agent includes one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol.

8. The method as in claim 4, wherein the optional seed material is included and wherein the seed material comprises zeolite structures of the same or similar crystalline framework structure as the crystalline aluminosilicate:
   wherein the crystalline aluminosilicate comprises MFI zeolites and seed materials comprise or more of include ZSM-5 (MFI), ZSM-8 (MFI), ZSM-11 (MEL) and Silicalite-1 (MFI); or
   wherein the crystalline aluminosilicate comprises beta zeolites and, seed materials comprise beta zeolites; or
   wherein the crystalline aluminosilicate comprises mordenite zeolites, seed materials comprise other mordenite zeolites; or
   wherein the crystalline aluminosilicate comprises FAU zeolites, seed comprise zeolite Y, zeolite X, USY zeolite, faujasite zeolite or small protozeolitic species (gels).

9. The method as in claim 1, wherein the precursors and reagents are effective for a crystalline material comprising a crystalline aluminosilicate, and wherein the precursors and reagents comprise a silica source, an aluminum source, an optional structure directing agent and an optional seed material, and wherein an alkali metal source is provided from a pH modified ODSO composition comprising an aqueous mixture of one or more water-soluble ODSO compounds and an effective amount of an alkaline agent, and wherein the alkaline agent includes an alkali metal component as the alkali metal source.

10. The method as in claim 1, wherein the crystalline material comprises pure silica zeolite, and wherein the precursors and reagents comprise a silica source, and one or both of a structure directing agent and a seed material.

11. The method as in claim 1, wherein the crystalline material comprises aluminophosphate, and wherein the precursors and reagents comprise an aluminum source, a phosphorus source, an acid medium, an optional structure directing agent and an optional seed material.

12. The method as in claim 1, wherein the crystalline material comprises silicoaluminophosphate, and wherein the precursors and reagents comprise an aluminum source, a silica source, a phosphorus source, an acid medium, an optional structure directing agent and an optional seed material.

13. The method as in claim 1, wherein the crystalline material comprises metal aluminophosphate, and wherein the precursors and reagents comprise an aluminum source, a metal source, a phosphorus source, an acid medium, an optional structure directing agent and an optional seed material.

14. The method as in claim 1, wherein the mixture of precursors and reagents includes an aluminum source is selected from the group consisting of aluminates, alumina, other zeolites, aluminum colloids, boehmites, pseudo-boehmites, aluminum hydroxides, aluminum salts, aluminum alkoxides, aluminum wire and alumina gels.

15. The method as in claim 1, wherein the mixture of precursors and reagents includes a silica source is selected from the group consisting of sodium silicate (water glass), rice husk, fumed silica, precipitated silica, colloidal silica, silica gels, zeolites, dealuminated zeolites, silicon hydroxides and silicon alkoxides.

16. The method as in claim 1, wherein:
the homogeneous aqueous mixture is (optionally) aged before being subjected to heating for a period of about 0-48 hours;
the homogeneous aqueous mixture is heated at a temperature in the range of about 90-200° C.;
the homogeneous aqueous mixture is heated at autogenous pressure or a pressure in the range of atmospheric to 17 bar; and
the homogeneous aqueous mixture is heated for a crystallization time period within the range of about 0.1-8 days.

17. The method as in claim 1, wherein the ODSO is derived from oxidation of disulfide oil compounds present in an effluent refinery hydrocarbon stream recovered following catalytic oxidation of mercaptans present in a mercaptan-containing hydrocarbon stream.

18. The method as in claim 1, wherein the one or more ODSO compounds comprise ODSO compounds having 3 or more oxygen atoms and 1 to 20 carbon atoms, and are contained in a mixture having an average density greater than about 1.0 g/cc and an average boiling point greater than about 80° C.

19. The method as in any claim 1, wherein the ODSO compounds have 3 or more oxygen atoms and include:
one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR),
two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR);
one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH); or
two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH);
wherein R and R' are C1-C10 alkyl or C6-C10 aryl groups.

20. A method of producing support particles for catalyst comprising:
providing amorphous material and crystalline material co-synthesized as in claim 1;
mixing and kneading the co-synthesized amorphous material and crystalline material with an effective amount of water to form a composite paste;
forming the composite paste into support particles by extrusion.

\* \* \* \* \*